June 23, 1964 H. H. WORMSER ETAL 3,138,777
POTENTIOMETERS
Filed Sept. 21, 1961

INVENTORS
Hans H. Wormser
John L. Mueller
BY Lawrence J. Field
William Grobow
ATTORNEYS United States Patent Office 3,138,777
Patented June 23, 1964

3,138,777
POTENTIOMETERS
Hans H. Wormser, 356 Shea Drive, New Milford, N.J., and John Louis Mueller, 408 E. 73rd St., New York, N.Y.
Filed Sept. 21, 1961, Ser. No. 139,716
7 Claims. (Cl. 338—183)

This invention relates to variable resistance devices and, more particularly, to a hermetically sealed rectilinear variable resistance device designed for operation in water, or under water, and having a stroke severely limited by the space allotted to the device.

Recent uses of rectilinear potentiometers in servo-mechanisms have necessitated refinements in their structure and function to render them more suited to the environment in which they must function. Many present applications require the use of potentiometers in environments which may be deleterious to their proper functioning, and efforts have already been made to hermetically seal potentiometers.

One of the commonest forms of seal applied to rectilinear variable resistors has been to put O rings around the shaft in the bushing area, e.g. as shown in United States Patent 2,759,080. This type of seal usually requires that the bushing must be extended, which is a distinct disadvantage in installations where space is at a premium and miniaturization is required. Other factors which have caused prior hermetically sealing constructions to fall short of 100% success, particularly in small diameter potentiometers, are due to the very considerable force which is required to move the shaft, and to excessive wear on the sealing members, principally due to abrasion of the shaft member on the seal material.

When the potentiometer is to be used in a liquid, the problem of fluid leakage is further complicated by the internal pressure fluctuation generated by the longitudinal travel of the shaft. The O ring type of seal also requires substantial force to move the potentiometer shaft.

The present invention is directed to providing a hermetically sealed potentiometer which is reliable in operation and which is not possessed of the aforementioned disadvantages.

The hermetically sealed potentiometer of the present invention includes a tubular housing assembly comprising two relatively moveable hollow tubular portions which are each closed on all but one side, and in which the open side of the first portion telescopes over the open side of the second portion. A hermetic seal between the two portions is maintained by a resilient enveloping member which is not subjected to the abrasion of a shaft member passing within it and which maintains a better hermetic seal over extended periods of time and which permits equalization of internal and external pressures as the portions telescope. A substantial space economy is effected by the use of this type of sleeve seal in conjunction with the telescoping potentiometer housing portions as compared with previous methods of sealing a rectilinear potentiometer by the use of a sleeve seal projecting forward of the potentiometer case.

A principal object of this invention is to provide a hermetically sealed rectilinear potentiometer which constitutes an improvement over previous hermetically sealed rectilinear potentiometers.

Another object of this invention is to provide a new and improved hermetically sealed rectilinear potentiometer in which the addition of a seal does not result in an increase in length.

Other objects and advantages of this invention will become more apparent from the description which follows and by referring directly to the accompanying drawings in which.

The potentiometer incorporating this invention comprises two major components, namely a housing assembly 10 for the fixed portion of the potentiometer which is attached to a support means, and a cover assembly which telescopes over the fixed portion of the potentiometer, in response to an actuating mechanism (not shown). One of the two portions of the potentiometer is provided with a resistance element, and the other portion is provided with an electrical contact which longitudinally traverses the resistance element mounted in the first portion.

Figure 4:
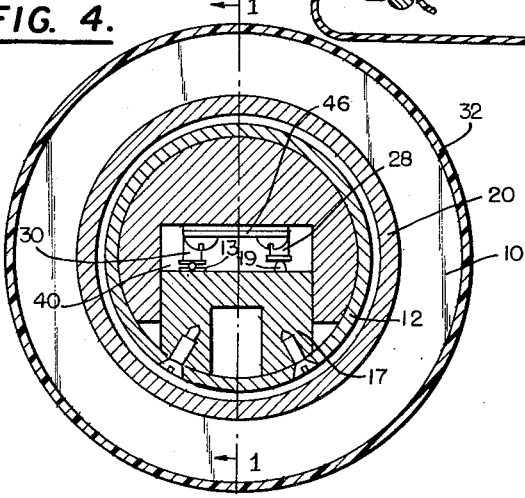
FIGURE 4 is a sectional view taken along lines 4—4 of FIGURE 1.

Referring now to the drawings in detail, reference character 11 designates a cup or cap adapted to serve as a mounting or support means which may be an instrument panel, for example. A case 12 serves as the housing for the fixed portion of the potentiometer. The junction of support member 11 and case 12 is caulked with suitable material. The surface of support member 11 adjacent to the inner mechanism of the potentiometer may be electrically insulated by a disc 16. An insulator block 17, is attached to case 12 by appropriate means, for example, screws, rivets, adhesives, or the like. The block 17 extends the length of the case 12 and acts as a guide for a brush block 26, thus limiting the brush to longitudinal travel. Secured to the insulator block 17, are a resistor track 13 and a collector track 19, as shown in FIGURE 4. Appropriately attached to the resistor track 13 and the collector track 19 by solder, rivets, or the like, are electrical lead wires 14. The point at which the lead wires 14 pass through support member 11 is caulked with suitable material. A stop 18 is attached to the inside of case 12 by screws, rivets, adhesives or other means to limit the longitudinal travel of the brush block assembly. Instead of using disc 16, insulation of support member 11 may be achieved by limiting travel of the brush block 26 to maintain an air gap sufficient to prevent arcing between brushes 28, 30 and member 11.

The second major component of the potentiometer is contained in, or attached to a movable cover 20. A bearing 22 is attached to, or comoulded with the cover 20 to maintain parallelism of the case 12 and the cover 20, and to reduce the friction between the cover 20 and the case 12 as they longitudinally telescope. The bearing may be made of polytetrafluoroethylene or other suitable material. An arm 24 is provided to serve as a support means for the brush block 26 and as means of connection to a drive device (not shown). The structure of the arm 24 may be varied without altering its function since its position is fixed in relation to the cover 20. In practice the arm may be attached to the cover 20 by means of screws, rivets, adhesives, or other fastening means. Two electrically conductive brushes, 28 and 30, are attached to the brush block 26 by screws or by any other appropriate means. Brush 28 is positioned on the brush block 26 so as to maintain contact with the surface of the collector track 19 and brush 30 is positioned so as to maintain contact with the surface of the resistor track 13. The brushes 28 and 30 are electrically connected by means of a common portion or a shunt wire 46.

Figure 3:
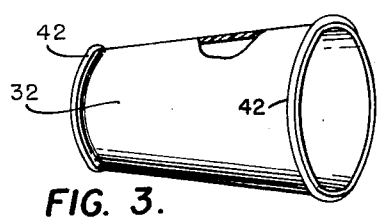
FIGURE 3 is a perspective view of the seal member of FIGURES 1 and 2.

The open side of the stationary case 12 and the open side of the movable cover 20 are hermetically sealed by a flexible seal 32 which envelopes the outer surfaces of both the open side of the case 12 and cover 20. Seal 32 may be fabricated from rubber or from a flexible plastic such as plasticized polyvinylchloride, preferably in the shape of a truncated cone as shown in FIGURE 3. The cover 20 is provided with a circumferential groove 36 which serves as positioning means for the movable end of the seal member 32. A grooved ring 38 is a part of or attached to case 12 to support the stationary end of the seal member 32. The seal 32 is held in the locating grooves by rubber or metal bands, garter springs, adhesives, or the like, and may be prevented from pulling out from under the holding means by an enlargement or bead 42 which is provided adjacent to the two open ends of seal 32.

In operation the open side of the cover 20 telescopes over the open side of the case 12, being actuated by apparatus connected to the arm 24. Since the apparatus actuating the potentiometer is not required for a understanding of the invention it has not been shown or described. While extending or distending, the brush block 26 is limited from rotating by means of the keyway 40 in brush block 26 which keyway is mated to the insulator block 17. Cover 20 can rotate relative to brush block 26 within the limits permitted by the seal 32. The cover 20 is prevented from disengaging from the case 12 by the contact between one end of the brush block and the stop 18. Its inward motion is limited by the full telescoping cover 20 over case 12. As the cover 20 moves longitudinally in response to the actuating mechanism (not shown), it causes the brush 28 to longitudinally slide over the surface of the collector track 19 in electrical contact with it, and the brush 30 to longitudinally slide over the surface of the resistor track 13 in electrical contact therewith. All openings in both the case and cover assemblies are caulked with a suitable material.

Figure 1:
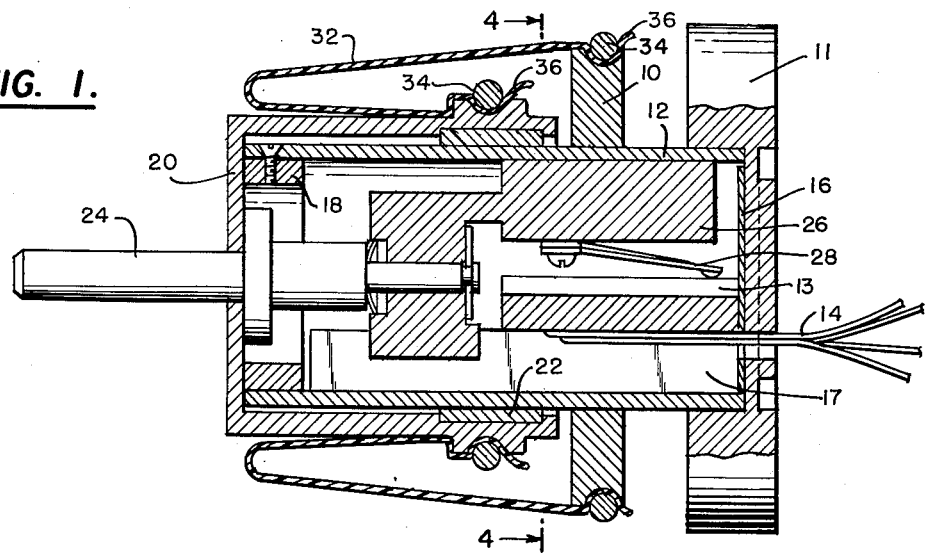
FIGURE 1 is a sectional view taken on the plane 1—1 of FIGURE 4 of a rectilinear potentiometer incorporating this invention; showing the elements in telescoped relation.
Figure 2:
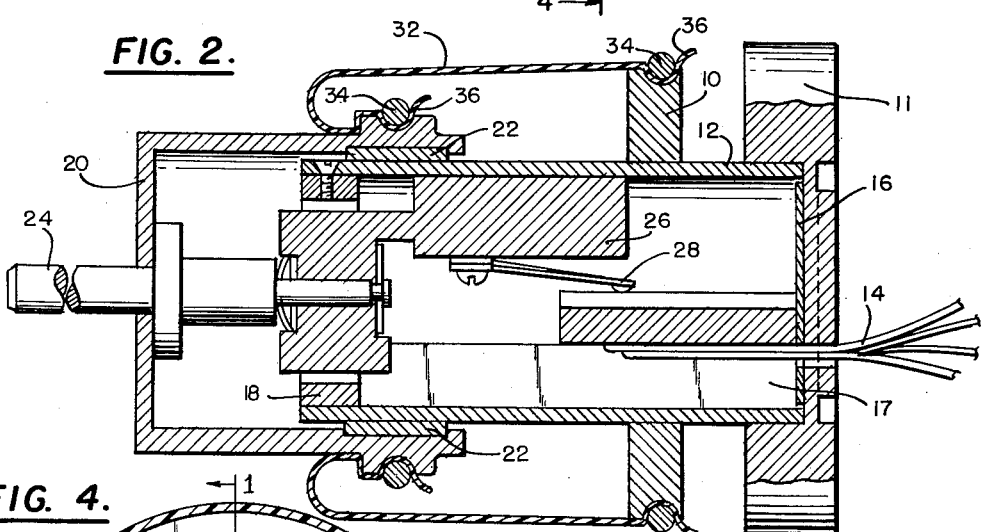
FIGURE 2 is a sectional view of the potentiometer of FIGURE 1 showing the elements after they have been partially expanded relative to one another.

One of the features of this invention is the manner in which the hermetic seal is maintained between the telescoping case and cover of the potentiometer. As can be noted by reference to FIGURE 1 and FIGURE 2, the hermetic seal between the case 12 and cover 20 is maintained by the resilient seal member 32 by virtue of the fact that it is held in close stationary engagement and sealed to both the cover 20 and the case 12. The configuration of the seal 32 as it approaches the two extremes of longitudinal travel of the potentiometer cover 20 is graphically illustrated by the comparison of FIGURES 1 and 2. As can be seen by comparison of the seal configuration in FIGURES 1 and 2, the resilient seal 32 rolls upon and inverts within itself as the potentiometer cover 20 moves longitudinally over the case 12.

Instead of the specific arrangement of parts described above, it would also be possible to have that portion of the cover assembly supporting the brush block remain stationary and for the inner tubular member to be movable with the shaft attached to it.

It is to be understood that other modifications of this invention may be made without departing from the spirit of the invention and that, accordingly, we do not intend that the invention be limited except by the scope of the appended claims.

What is claimed is:

1. A hermetically sealed rectilinear potentiometer assembly comprising a first tubular hollow housing portion closed on all but one side, and a second tubular hollow housing portion of a similar and mating cross section to the first housing, closed on all but one side; said first and said second tubular hollow housing portions being movable relative to one another with the open side of said first tubular hollow housing portion facing and telescoping over the open side of said second tubular hollow housing portion; a rectilinear variable resistance element supported in one of the two said tubular hollow housing portions; a means for making electrical connection to external circuit from said rectilinear resistance element; a brush block supported in the other of the two said tubular hollow housing portions; a means carried by said brush block for making electrical contact to said rectilinear resistance element; a means electrically connected with the last aforesaid means and with an external circuit; and an enveloping seal comprising a flexible tubular member open at both ends, one portion of said enveloping seal being secured to the outside surface of said first tubular hollow housing portion and another portion of said enveloping seal being secured to the outside surface of said second tubular hollow housing portion.

2. A hermetically sealed rectilinear potentiometer assembly comprising a first movable tubular hollow housing portion closed on all but one side, and a second fixed tubular hollow housing portion closed on all but one side; said first and said second tubular hollow housing portions being moveable relative to one another with the open side of said movable tubular hollow housing portion facing and telescoping over the open side of said fixed tubular hollow housing portion; a rectilinear variable resistance element supported in said fixed tubular hollow housing portion; a means for making electrical connection to external circuit from said rectilinear resistance element; a brush block supported in said movable tubular hollow housing portion; a means carried by said brush block for making electrical contact to said rectilinear resistance element; a means making electrical contact with the last aforesaid means and with an external circuit; said first tubular hollow housing portion being provided with an encircling groove on its outer surface; said second tubular hollow housing portion being provided with an encircling groove on a projection on its outer surface, and a truncated conical enveloping seal; said truncated conical enveloping seal comprising a flexible tubular member open at both its ends; one portion of said truncated conical enveloping seal being secured in an encircling groove on the outside surface of said first tubular hollow housing portion and another portion of said truncated conical enveloping seal being secured on the outside of said second tubular hollow housing portion.

3. A hermetically sealed rectilinear potentiometer assembly comprising a first tubular hollow housing portion closed on all but one side, and a second tubular hollow housing portion closed on all but one side; said first and said second tubular hollow housing portions being movable relative to one another with the open side of said first tubular hollow housing portion facing and telescoping over the open side of said second tubular hollow housing portion; a rectilinear variable resistance element supported in said second tubular hollow housing portion; a means for making electrical connection to external circuit from said rectilinear resistance element; a brush block supported in said first tubular hollow housing portion; a means carried by said brush block for making electrical contact to said rectilinear resistance element; a means electrically connected with the last aforesaid means and with an external circuit; said first tubular hollow housing portion being provided with an encircling groove on its outer surface; said second tubular hollow housing portion being provided with an encircling groove on a projection on its outer surface; and an enveloping seal; said enveloping seal comprising a flexible tubular member open at both its ends; a first end of said enveloping seal being secured in said groove on the outside surface of said first tubular hollow housing portion and a second end of said enveloping seal being secured in said groove on the outside surface of said second tubular hollow housing portion.

4. The hermetically sealed rectilinear potentiometer as defined in claim 3 where the first end of enveloping seal is secured in the encircling groove on the outside surface of said first tubular hollow housing portion and said second end of enveloping seal is secured in the encircling groove on the outside surface of said second tubular hollow housing portion by garter springs.

5. The hermetically sealed rectilinear potentiometer as defined in claim 3 where the first end of enveloping seal is secured in the encircling groove on the outside surface of said first tubular hollow housing portion and said second end of enveloping seal is secured in the encircling groove on the outside surface of said second tubular hollow housing portion by metal rings.

6. The hermetically sealed rectilinear potentiometer as defined in claim 3 where the first end of enveloping seal is secured in the encircling groove on the outside surface of said first tubular hollow housing portion and said second end of enveloping seal is secured in the encircling groove on the outside surface of said second tubular hollow housing portion by adhesives.

7. The hermetically sealed rectilinear potentiometer as defined in claim 1 wherein the flexible tubular member open at both its ends is provided with an enlarged bead around the periphery of each of its open ends, one bead being adapted to seal in a recess in the first portion of the housing and the other bead being adapted to seal in a recess in the second portion of the housing.

References Cited in the file of this patent

UNITED STATES PATENTS

| | | |
|---|---|---|
| 1,268,666 | Archibald et al. | June 4, 1918 |
| 2,714,184 | Peck | July 26, 1955 |
| 2,803,729 | Kohring | Aug. 20, 1957 |
| 2,927,294 | Bourns | Mar. 1, 1960 |